United States Patent [19]

Kojima

[11] Patent Number: 4,623,770

[45] Date of Patent: Nov. 18, 1986

[54] METHOD OF IMPARTING CREASE TO POLYESTER FIBER GOODS

[75] Inventor: Masuji Kojima, Ohtsu, Japan

[73] Assignee: Toray Industries, Inc., Tokyo, Japan

[21] Appl. No.: 642,424

[22] Filed: Aug. 20, 1984

[30] Foreign Application Priority Data

Aug. 24, 1983 [JP] Japan ................... 58-153025
Mar. 15, 1984 [JP] Japan ................... 59-48130
Mar. 15, 1984 [JP] Japan ................... 59-36075[U]

[51] Int. Cl.$^4$ .................................. H05B 6/62
[52] U.S. Cl. ........................... 219/10.41; 219/10.53; 219/10.81; 219/10.57; 156/272.2; 156/274.6; 223/28; 223/51
[58] Field of Search ............... 219/10.81, 10.41, 10.43, 219/10.57, 10.75, 10.53; 223/28, 51, 70, 73, 76; 156/272.2, 273.7, 273.3, 274.4, 274.6

[56] References Cited

U.S. PATENT DOCUMENTS

| | | | |
|---|---|---|---|
| 2,621,138 | 12/1952 | Messing | 219/10.81 X |
| 2,630,519 | 3/1953 | Gard | 219/10.81 X |
| 2,922,865 | 1/1960 | Schattler et al. | 219/10.53 X |
| 3,146,141 | 8/1964 | Woodland | 219/10.53 X |
| 3,341,955 | 9/1967 | Pyke et al. | 223/28 X |
| 3,791,908 | 2/1974 | Gidge | 156/273.7 |
| 4,269,334 | 5/1981 | Chodosh | 223/28 |

FOREIGN PATENT DOCUMENTS

40-9559  5/1965  Japan ...................... 223/28

Primary Examiner—Philip H. Leung
Attorney, Agent, or Firm—Scully, Scott, Murphy & Presser

[57] ABSTRACT

The portion to be creased of polyester fiber goods is subjected to pressing and high-frequency treatment by means of a press bar attached to an upper electrode of a high-frequency welding machine, whereby a solid crease can be imparted to the polyester fiber goods.

4 Claims, 4 Drawing Figures

FIG.2 (ii)

METHOD OF IMPARTING CREASE TO POLYESTER FIBER GOODS

BACKGROUND OF THE INVENTION

The present invention relates to a method of imparting to polyester fiber goods a solid crease superior in washing resistance fiber.

Typical examples of creases to be imparted to goods made of polyester fiber alone or blends thereof with other fibers include pleat lines of slacks, pants and skirts, and creases of front edges, collar edges, hem edges and seam allowance openings of various garments. The following methods have heretofore been adopted as crease imparting methods: ① using an iron, ② using a steam press, ③ using a hot head press, and ④ using a pleating machine. However, these conventional methods involve the following disadvantages. In method ①, which uses electric heat or steam as a heat source, it is impossible to obtain a solid crease, and the surface of garments is easily crushed because the heat source is slid along the surface. In method ②, a short-time treatment (within 60 seconds) does not afford a solid crease because the heat source is only steam. In the method ③, energy consumption is large because the heat conduction from the surface of garment to the interior requires a relatively long time, and the fiber which constitutes the surface of garment is deteriorated in quality due to the high temperature and pressure. In method ④, large-sized equipment is required for pressurization between electric heating rollers or for treatment in a steam box, the energy consumption is large and the working time is relatively long.

SUMMARY OF THE INVENTION

It is an object of the present invention to provide a method capable of overcoming the above-mentioned disadvantages of the conventional methods and imparting a crease strong enough to resist repeated washings to polyester fiber goods by simple means without impairing the quality of the goods.

It is another object of the present invention to provide an apparatus effective for practicing the above method.

Other objects and advantages of the present invention will become apparent from the following description.

According to the method of the present invention, a crease is imparted to polyester fiber goods by pressing the portion of the polyester fiber goods to be creased with a press bar attached to an upper electrode of a high-frequency welding machine and performing a high-frequency treatment.

Preferably, this method is carried out by pressing the portion to be creased of polyester fiber goods so that not the whole but 40 to 90% in a transverse section of the lower surface of the above press bar comes into contact with the goods, and performing a high-frequency treatment.

BRIEF DESCRIPTION OF THE DRAWINGS

FIGS. 1, 2(i) and 2(ii) are schematic partial sectional views of a high-frequency welding machine equipped with a stopper used in the present invention.

PREFERRED EMBODIMENTS OF THE INVENTION

In the present invention, polyester fiber goods are used as goods to be treated. Preferred polyesters are those consisting principally of polyethylene terephthalate or polybutylene terephthalate. The "polyester fiber goods" referred to herein indicate product or products obtained from woven, knitted and non-woven fabrics made of polyester fiber or blends thereof with other synthetic or natural fibers. In the case of blended polyester fiber goods, it is preferable that the polyester fiber content be at least 50by weight, in order to enhance the creasing effect, and it is more preferable that at least 50% by weight of polyester fiber be present in the fibers arranged in the direction orthogonal to the creasing direction.

Examples of creases to be imparted include pleat lines of slacks, pants and skirts, and creases of front edges, collar edges, hem edges and seam allowance openings of various garments.

As the high-frequency welding machine, there may be used conventional apparatus having a press bar, for example, LW-4000W (trade name, manufactured by Queen Light Ind., (Ltd.) and TDW-4003DA (trade name, manufactured by Tokushu Denki Kogyo Ltd.).

The polyester fiber goods are disposed on a lower electrode of a high-frequency welding machine so that the portion to be creased is positioned along the length of the press bar. Preferably, it is disposed so that 40 to 90% in a transverse section of the lower surface of the press bar is in contact with the polyester fiber goods, the portion of which to be creased constitutes an edge. In other words, it is preferable that 60 to 10% in a transverse direction of the lower surface of the press bar be kept out of contact with the polyester fiber goods during application of a high frequency impress. In order to facilitate such an arrangement, it is preferable to provide a stopper for positioning the edge of the polyester fiber goods to be creased movable so that an end portion of the stopper is within the press bar region before application of pressure and is outside the same region during application of pressure.

The present invention will be described hereinunder with reference to the drawings.

Figure 1:
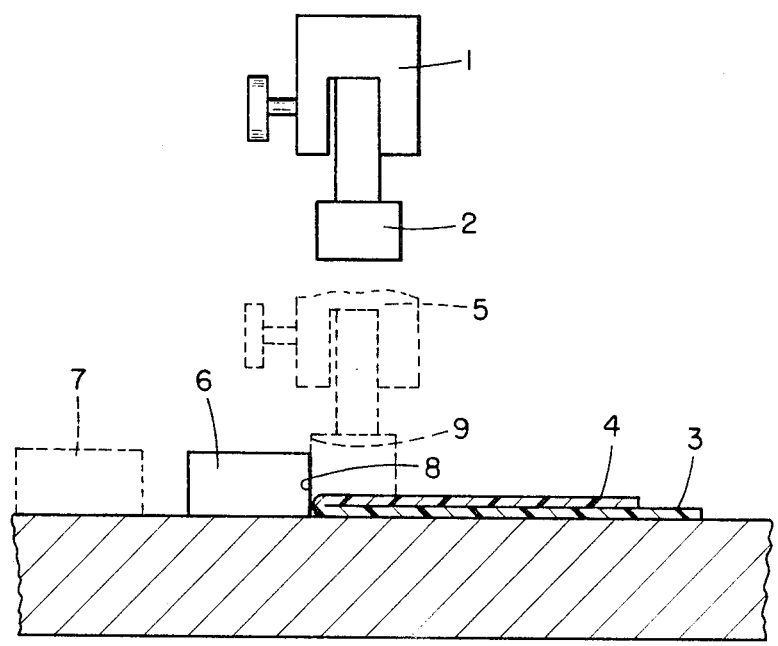
Figure 2:
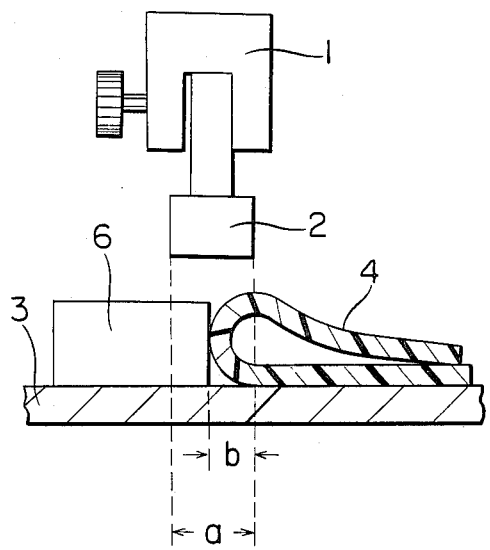
Figure 2:
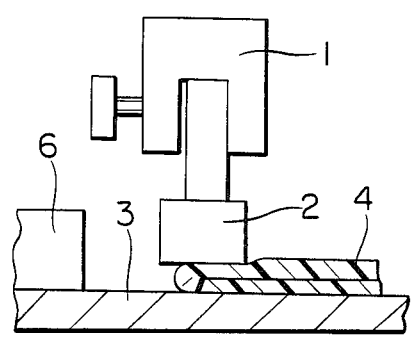

FIGS. 1 and 2 are schematic partial sectional views of a high-frequency welder equipped with a stopper used in the present invention.

In FIG. 1, the numeral 1 denotes an upper electrode (upper electrode position in positioning polyester fiber goods) and the numeral 2 denotes a press bar (press bar position in positioning polyester fiber goods), which presses polyester fiber goods 4 on a lower electrode 3 in such a state as shown in dotted lines 5. The numeral 6 indicates a stopper position during positioning for the polyester fiber goods, namely, before application of pressure, and the numeral 7 indicates a stopper position during application of pressure. Further, the numerals 8 and 9 denote a side face of the stopper on the press bar side and a side face of the press bar on the stopper side, respectively.

FIGS. 2(i) and 2(ii) illustrate the high-frequency welding machine respectively before and during application of pressure.

In positioning the polyester fiber goods to be creased, as is apparent from FIGS. 1 and 2, the stopper is in a position in which it will contact the lower surface of the press bar but it moves away from the press bar just before application of pressure. The vertical movement of the upper electrode and the movement of the stopper can be interlocked by a suitable known means.

Under such construction, the polyester fiber goods can be positioned easily so that the ratio of the polyester fiber goods "b" including a portion to be creased to the width "a" of the lower surface of the press bar is in the range of 40 to 90%. Preferably, "b" corresponds to about 0.1 to 2 cm. If the "b" exceeds 90%, the portion being creased will protrude to the outside of the pressure bar during application of pressure and high frequency impress, thus making it impossible to obtain a satisfactory creasing effect, and it is below 40%, the spacing between the upper and lower electrodes may become non-uniform, or a local spark may occur, thus also making it impossible to obtain a satisfactory creasing effect.

Figure 3:
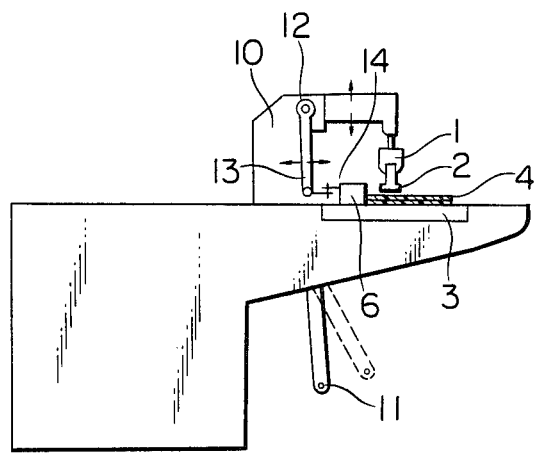
FIG. 3 is a schematic side view of a high-frequency welding machine equipped with a moveable stopper useful for practicing the present invention.

FIG. 3 is a schematic side view showing an example of a high-frequency welding machine equipped with a movable stopper, where 1 is an upper electrode, 2 is a press bar, 3 is a lower electrode, 4 is a polyester fiber goods sample, 6 is a stopper, 10 is a press body and 11 is a foot pedal. A stopper actuating arm 13 is mounted on an upper electrode moving shaft 12 which serves as a fulcrum during vertical movement of the upper electrode. The lower end of the stopper actuating arm 13 is connected to the stopper 6 through a spacing adjusting screw 14. As the upper electrode moves downward, the stopper retreats, while as the upper electrode moves upward, the stopper advances and performs a predetermined positioning. The movement of the stopper can also be done by the utilization of an air cylinder or a spring. It is particularly preferable that the stopper before application of pressure be in an advanced position by 10 to 60% along the width of the lower surface of the press bar in the press bar region, as previously noted.

By subjecting the polyester fiber garments to a high-frequency treatment according to the present invention, there is performed an effective internal heating and only the pressed portion of the garments per se generates heat, and in combination with a heat setting effect induced by a rapid cooling action at room temperature of the pressed portion, a solid crease is imparted to the polyester fiber garments in a short time.

Particularly, the present invention is effectively applicable to work pants made of polyester fiber which become badly stained in use and require washings under severe conditions. The process of the present invention can impart thereto a crease line which does not disappear even after repeated washings under severe industrial washing conditions.

A conventional stopper for high-frequency welding machines is a fixed, but in the case where a stopper is fixed outside the press bar, it cannot fulfil the function as a creasing stopper. Also known is the type in which a stopper is fixed in a position where a stopper end and a press bar end are in contact with each other. In this case, however, a high frequency may be discharged from the press bar to the stopper end, thus making it impossible to attain a satisfactory internal heating effect.

The following examples are given to further illustrate the present invention.

EXAMPLE 1

A wearing and washing test was conducted in such a manner that ten panel members, made of the following woven fabric, were placed on mens work pants. Thereafter the work pants were washed; more particularly, an industrial washing was performed once after three days' wearing or the work pants and this was repeated twenty times (wearing: 60 days, washing: 20 times):

Warp yarn . . . 65% polyester, 35% cotton, 34 S/2
Weft yarn . . . textured yarn using 100% polyester, 300D
Density of woven fabric . . . 116 warps×55 wefts (/2.54 cm)
Weight of fabric . . . 275 g/m²
Fabric design . . . twill Creasing conditions, industrial washing conditions and results of wearing and washing are as tabulated below.

TABLE 1

(Creasing conditions)

| | | |
|---|---|---|
| High Frequency Method (Present Invention) | Machine | QUEEN LIGHT LW4000W |
| | Press bar | 0.6 cm wide × 75 cm long |
| | Press | foot pedal system |
| | Output | 0.3 ampere |
| | Frequency | 40.46 MHz |
| | Impress | 5 seconds |
| | Cooling | 3 seconds (room temperature) |
| Hot Head Press Method (Conventional Method) | Machine | JUKI PRESS JAK-754-1 |
| | Temperature of head surface | 190° C. |
| | Steaming | none |
| | Baking | 20 seconds |
| | Vacuuming | 10 seconds |

TABLE 2

(Industrial washing conditions)

| | |
|---|---|
| Washing | Washer type, 70° C., 30 minutes |
| Rinse washing | 50–30° C., 10 minutes |
| Pre-drying | Tumbler drying, 70° C., 15 minutes |
| Steaming | Tunnel fisher, 160° C., 1 minute |
| Dry finish | |

TABLE 3

(Evaluation after wearing and washing)

| | Creasing Method | |
|---|---|---|
| Evaluation | High Frequency Method | Hot Head Press Method |
| Before wearing and washing | Class 5 | Class 5 |
| After wearing and washing | Class 4 | Class 1-2 |

Remarks: Evaluation
Class 5: very sharp crease
Class 4: fairly sharp crease
Class 3: not so sharp crease
Class 2: faint crease
Class 1: no crease Creases of Class 3 and higher are satisfactory in practical use and appearance. In the evaluation of creases after repeated wearing and washing 20 times, as is apparent from the results shown in Table 3, the creases formed by the high-frequency method according to the present invention were evaluated as Class 4 and thus extremely satisfactory. On the other hand, the creases formed by the conventional hot head press method were evaluated as Class 1 to Class 2 and thus extremely unsatisfactory, the difference from the present invention being very clear.

EXAMPLE 2

Mens work pants made of the following woven fabric were subjected to a high-frequency treatment using a high-frequency welding machine "TDW-4003DA" (manufactured by Tokushu Denki Kigyo Ltd., press bar: 1.0 cm wide by 75.0 cm long) under the conditions of tuning dial 50 (0.5–0.6 amp. current) and 5 seconds' impress while changing the position of the portion to be creased:

Warp yarn ... 65% polyester, 35% cotton, 34 S/2

Weft yarn ... textured yarn using 100% polyester, 300D

Density of woven fabric ... 116 warps×55 wefts (/2.54 cm)

Weight of fabric ... 275 g/m$^2$

Fabric design ... twill

Results are as set out in Table 4, in which Run No. 1 is before the high-frequency treatment, Run Nos. 2 and 3 are with b/a (as illustrated in FIG. 2($i$))×100 exceeding 90%, and Run Nos. 8 and 9 are with b/a×100 being lower than 40%. From the results shown therein it is seen that a remarkable effect is obtained where b/a×100 is in the range of 40 to 90%.

TABLE 4

| Run No. | $\frac{b}{a} \times 100$ | Pleatability* | Protrusion of** Crease Portion | Trouble in Pressing*** |
|---|---|---|---|---|
| 1 | | 0.89 (original fabric × 2) | — | — |
| 2 | 100 | 1.01 | protrude almost every time | none |
| 3 | 95 | 0.91 | protrude at times | " |
| 4 | 90 | 0.78 | none | " |
| 5 | 80 | 0.77 | " | " |
| 6 | 60 | 0.76 | " | " |
| 7 | 40 | 0.73 | " | " |
| 8 | 30 | — | " | spark at times |
| 9 | 20 | — | " | spark every time |

*The fabric thickness of the pressed portion was measured in order to express the pleatability in terms of numerical value (unit: mm).
**Indicates a state in which the crease edge protrudes from the press bar and creasing cannot be done satisfactority.
***Indicates a state in which the press bar tilts during pressing, thereby causing a non-uniform spacing between upper and lower electrodes, or a local spark occurs due to the resultant uneven pressing, thus making it impossible to effect a sufficient internal heating for the portion being creased.

What is claimed is:

1. A method of imparting a crease to polyester fiber goods which comprises: folding a portion of the polyester fiber goods to be creased; placing the folded portion of the polyester fiber goods between an upper electrode and a lower electrode of a high frequency electric welding machine; pressing the folded portion to be creased of the polyester fiber goods with a press bar attached to said upper electrode of said high frequency electric welding machine so that 40% to 90% in the width direction of the lower surface of the press bar is in contact with the polyester fiber goods including the folded portion to be creased; and energizing said high frequency electric welding machine at a frequency in the order of megahertz and under conditions effective to impart a crease to said fiber goods.

2. The method of claim 1 wherein the polyester fiber goods contain at least 50 percent by weight of polyester fiber.

3. The method of claim 1, wherein the polyester fiber goods contain at least 50 percent by weight of polyester fiber in a direction orthogonal to the creasing direction.

4. The method of claim 1, wherein the width of the portion to be creased of the polyester fiber goods is 0.1 to 2 cm.

* * * * *